(12) United States Patent
Asatryan et al.

(10) Patent No.: US 9,448,456 B2
(45) Date of Patent: Sep. 20, 2016

(54) TUNABLE LIQUID CRYSTAL OPTICAL DEVICE

(71) Applicants: Karen Asatryan, Quebec (CA); Tigran Galstian, Quebec (CA); Aram Bagramyan, Quebec (CA); Vladimir Presniakov, Quebec (CA); Amir Tork, Quebec (CA); Armen Zohrabyan, Quebec (CA); Peter P. Clark, Boxborough, MA (US)

(72) Inventors: Karen Asatryan, Quebec (CA); Tigran Galstian, Quebec (CA); Aram Bagramyan, Quebec (CA); Vladimir Presniakov, Quebec (CA); Amir Tork, Quebec (CA); Armen Zohrabyan, Quebec (CA); Peter P. Clark, Boxborough, MA (US)

(73) Assignee: LENSVECTOR, INC., Sunnyvale, CA (US)

( * ) Notice: Subject to any disclaimer, the term of this patent is extended or adjusted under 35 U.S.C. 154(b) by 134 days.

(21) Appl. No.: 14/048,297

(22) Filed: Oct. 8, 2013

(65) Prior Publication Data
US 2014/0036183 A1    Feb. 6, 2014

Related U.S. Application Data

(62) Division of application No. 12/996,593, filed as application No. PCT/CA2009/000743 on Jun. 5, 2009, now abandoned.

(60) Provisional application No. 61/074,651, filed on Jun. 22, 2008, provisional application No. 61/059,274, filed on Jun. 6, 2008.

(51) Int. Cl.
G02F 1/133    (2006.01)
G02F 1/139    (2006.01)
G02F 1/29     (2006.01)
(Continued)

(52) U.S. Cl.
CPC .......... *G02F 1/139* (2013.01); *G02F 1/29* (2013.01); *G02F 1/1343* (2013.01); *G02F 1/1347* (2013.01); *G02F 1/1395* (2013.01); *G02F 1/133723* (2013.01); *G02F 1/133784* (2013.01);
(Continued)

(58) Field of Classification Search
CPC ....................................................... G02F 1/133
See application file for complete search history.

(56) References Cited

U.S. PATENT DOCUMENTS 7,317,499 B2   1/2008   Paukshto et al.
7,859,640 B2   12/2010  Galstian et al.
(Continued)

FOREIGN PATENT DOCUMENTS

JP    61-156221 A    7/1986
JP    2004-4616 A    1/2004
(Continued)

OTHER PUBLICATIONS

3rd Office action dated Aug. 30, 2013 from SIPO (China) in counterpart CN application No. 200980121162.8, including examination opinion, Search Report and examined claims 1-3.
(Continued)

*Primary Examiner* — Timothy L Rude
(74) *Attorney, Agent, or Firm* — J-TEK Law PLLC; Jeffrey D. Tekanic; Scott T. Wakeman

(57) ABSTRACT

A liquid crystal optical device has a layered structure with split liquid crystal layers having alignment surfaces that define in a liquid crystal material pre-tilt angles of opposite signs. Four liquid crystal layers can provide two directions of linear polarization. In the case of a lens, the device can be a gradient index lens, and the alignment surfaces can have a spatially uniform pre-tilt.

9 Claims, 21 Drawing Sheets

(51) Int. Cl.
  *G02F 1/1337* (2006.01)
  *G02F 1/1343* (2006.01)
  *G02F 1/1347* (2006.01)

(52) U.S. Cl.
  CPC .............. *G02F 2001/133749* (2013.01); *G02F 2001/291* (2013.01)

(56) References Cited

U.S. PATENT DOCUMENTS

| | | |
|---|---|---|
| 2004/0036821 A1 | 2/2004 | Paukshto et al. |
| 2005/0151906 A1 | 7/2005 | Yoshimi et al. |
| 2007/0229754 A1 | 10/2007 | Galstian et al. |
| 2008/0055536 A1 | 3/2008 | Shimozono et al. |
| 2009/0213321 A1 | 8/2009 | Galstian et al. |
| 2009/0316097 A1 | 12/2009 | Presniakov et al. |
| 2010/0321595 A1* | 12/2010 | Chiu .................................. 349/2 |
| 2011/0109823 A1 | 5/2011 | Galstian et al. |
| 2011/0109824 A1* | 5/2011 | Galstian .......................... 349/33 |

FOREIGN PATENT DOCUMENTS

| | | |
|---|---|---|
| JP | 2006313243 | 11/2006 |
| WO | 2007098602 | 9/2007 |

OTHER PUBLICATIONS

International Search Report from parent PCT application No. PCT/CA2009/000743.

Wang et al., "Liquid crystal lens with stacked structure of liquid-crystal layers", Optics Communications (250), 2005, pp. 266-273.

Written Opinion from parent PCT application No. PCT/CA2009/000743.

Communication dated Apr. 26, 2013 from the EPO in counterpart IP application No. 09756992.5, including European Search Opinion, Supplementary European Search Report and examined claims 1-15.

Chinese application 2013107310324 2nd office action dated Jul. 28, 2016 with related claims.

* cited by examiner

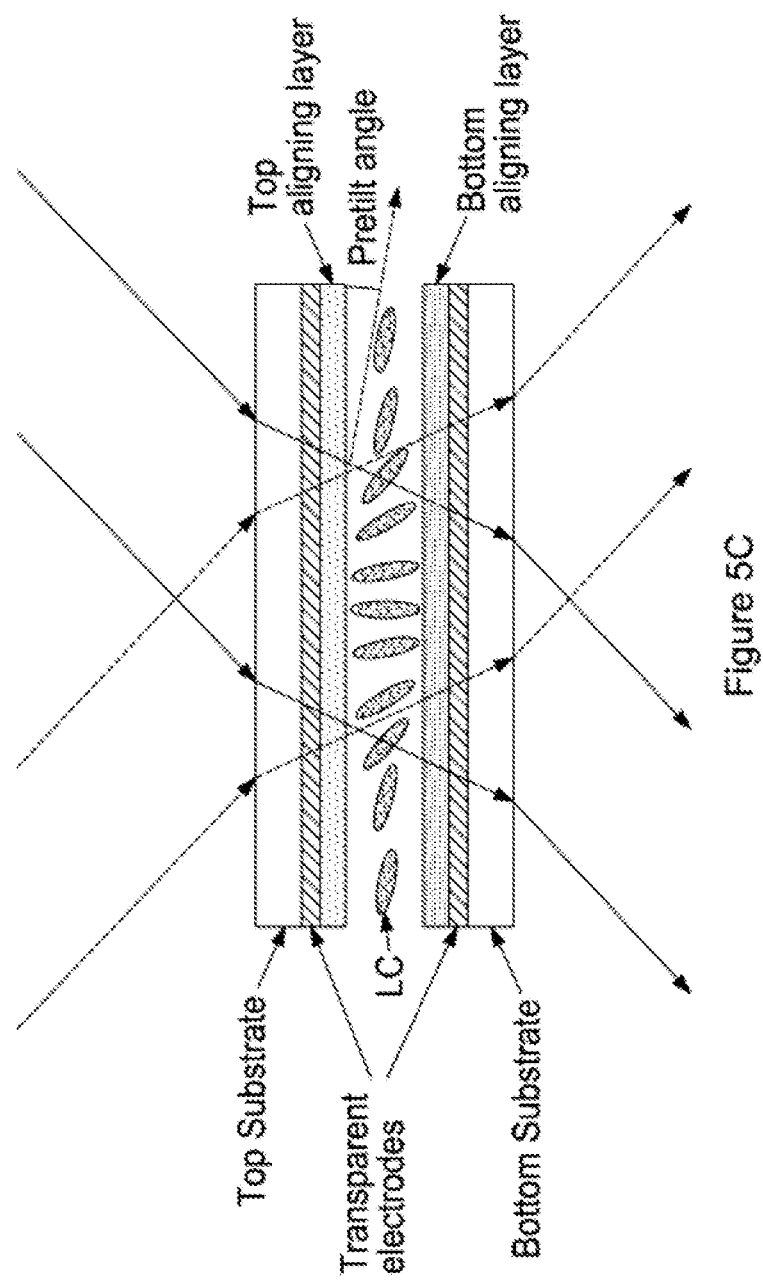

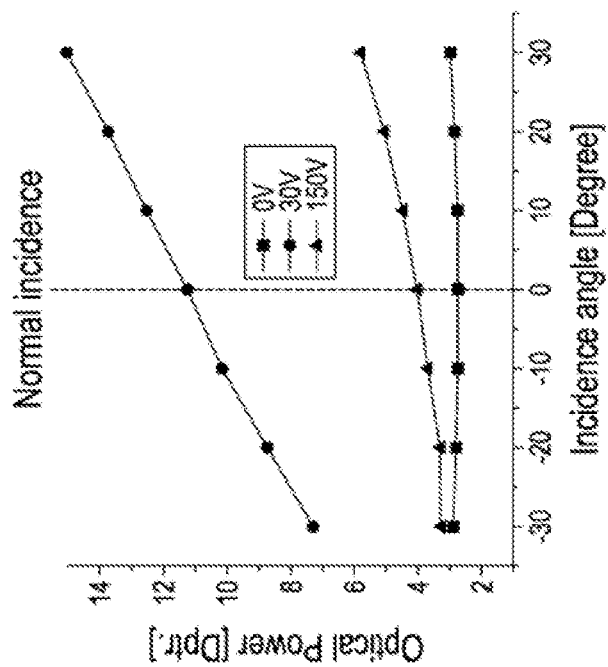
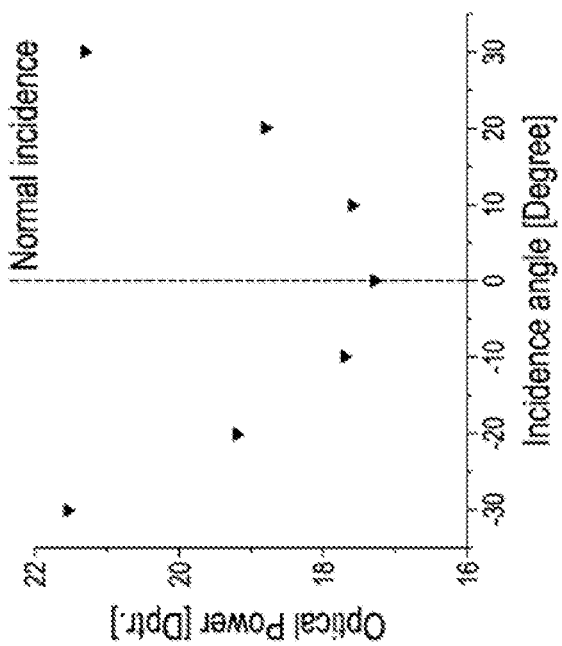
Figure 7A
Figure 7B

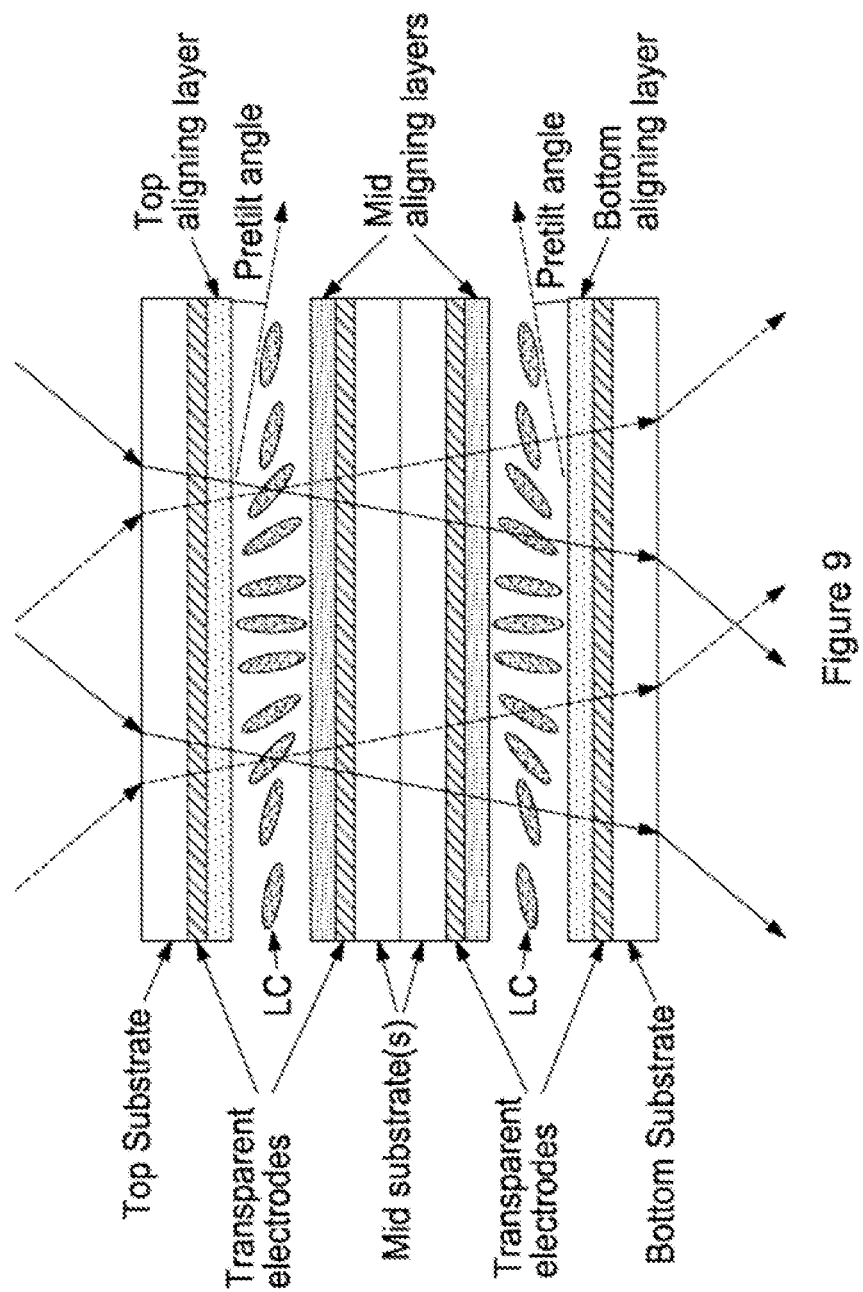

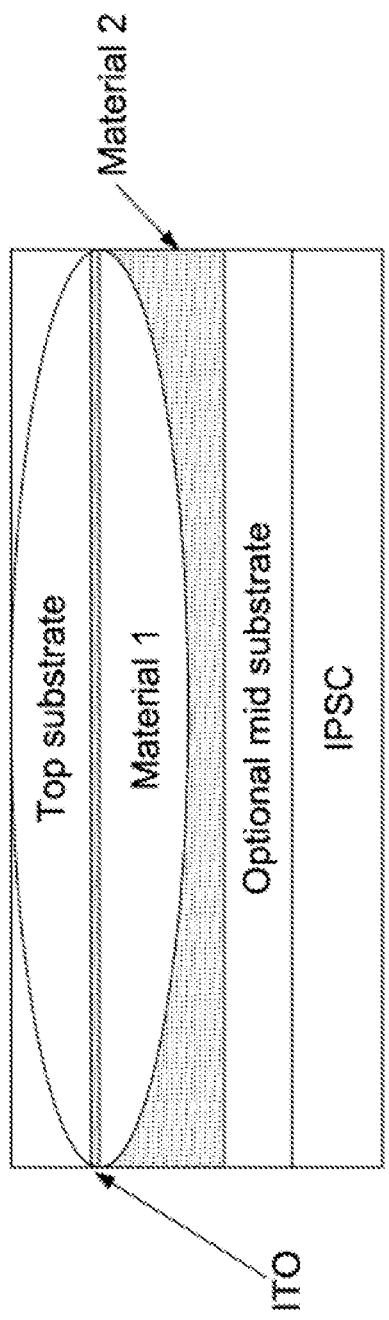

TUNABLE LIQUID CRYSTAL OPTICAL DEVICE

CROSS-REFERENCE

This application is a divisional application of U.S. Ser. No. 12/996,593, filed Dec. 6, 2010. That application in turn is the US national stage of International Patent Application No. PCT/CA2009/000743 filed on Jun. 5, 2009, which claims priority to U.S. Provisional Patent Application No. 61/074,651 filed on Jun. 22, 2008 and U.S. Provisional Patent Application No. 61/059,274 filed on Jun. 6, 2008.

TECHNICAL FIELD

The present invention relates to tunable liquid crystal optical devices and their manufacture.

BACKGROUND

A tunable optical device based on liquid crystal technology has many advantages over existing alternatives. These advantages and the tunable liquid crystal lens (TLCL) technology are discussed in detail in PCT publication WO2007/098602 dated Sep. 7, 2007. The devices may be compact, have no moving parts and are tunable to change optical properties, such as focus, magnification, steering angle, etc. In these devices, transparent electrodes are included that require electrical connection. For many applications, low cost is an important feature.

The ability of liquid crystal to modulate the propagation of light depends on the difference in optical properties in different directions with respect to the liquid crystal molecules. In PCT WO2007/098602 it is shown in FIG. 11 that a liquid crystal layer may act to focus light in a single polarization plane, and that two liquid crystal layers can be arranged to act on different polarization planes. This leads to tunable liquid crystal devices that have a plurality of liquid crystal layers.

SUMMARY

One area where fabrication in parallel has been practiced to great success is in the manufacturing of semiconductor devices. Semiconductor devices are fabricated in two dimensional, planar arrays called wafers, which are only singulated in one of the final processing steps. This process is generally referred to as wafer scale processing.

Tunable liquid crystal optical devices (herein referred to as "TLCL") can benefit from manufacture in a low cost manner by fabricating many of the devices in parallel. When manufacturing semiconductor devices in parallel, the singulated devices are typically connected using contact pads on the top surface to permit contact to be made from one surface. Semiconductor devices are fabricated in two dimensional, planar arrays called wafers, which are only singulated in one of the final processing steps. This process is generally referred to as wafer scale processing.

It has been discovered that "half TLCL's", namely a device comprising a liquid crystal cell acting on one polarization direction, can be fabricated in a wafer scale process and then rotated, flipped and bonded or packaged together to form a "whole TLCL" that is polarization independent. The thinness of the half TLCL devices allows for identical half TLCL's to be combined and essentially provide the same optical properties for each polarization.

It has also been discovered that a TLCL acting on two orthogonal polarizations can suffer the drawback that each half TLCL is sensitive to the angle at which rays interact with the liquid crystal. It has been discovered that by splitting a half TLCL into two opposite sign pre-tilt angle cells, even if controlled by the same electrode system, the optical properties of the half TLCL have much reduced angular dependence.

It has also been discovered that two layers of liquid crystal can be arranged in a superposed manner with a mid layer separating the two layers, in which the upper layer has a top alignment layer and the lower layer has a bottom alignment layer with the mid layer not defining a pre-tilt angle within the liquid crystal layers. This arrangement allows the mid layer to be very thin and thus for the two liquid crystal layers to be controlled by essentially the same field, even when there is some gradual variation in the control field in the vertical direction within the liquid crystal layers. The two layers can have different zero field liquid crystal orientations defined by alignment layers, for example opposed pre-tilt angle layers, namely one layer providing a +alpha pre-tilt angle and a second layer with a –alpha pre-tilt angle. The mid layer can provide a direction of ordering of the liquid crystal at its surface without defining a pre-tilt angle, for example using with a stretched sheet of material. The liquid crystal can be given its orientation from the alignment layer of the top or bottom substrate and then this order is maintained by the mid layer having a direction of ordering.

It has also been discovered that a layer involved in spatially modulating an electric field can be arranged between different liquid crystal layers of a split cell liquid crystal optical device so that the spatial modulation induced by the layer involved in spatially modulating the electric field has the same effect on one or more layers above and one or more layers below. In some embodiments, the spatial modulation layer is a layer that has a spatial distribution of a material having a high dielectric constant at the frequencies of the control field. In other embodiments, the layer comprises a material with a complex dielectric constant that allows the electric field to be shaped differently as a function of control signal frequency.

In some embodiments, there is provided a liquid crystal lens that comprises four layers of liquid crystal each having a uniform pre-tilt angle and direction, thus providing two polarization directions and two opposed pre-tilt angles for each polarization so that an image is essentially polarization independent and not sensitive to incidence angle.

The arrangements of the present invention are described with respect to a tunable gradient index refractive lens, however they are in many cases applicable to diffractive lenses, fixed optical power LC lenses (i.e. that operate in the ground state with no electrodes), tunable shutters, tunable irises, beam steering devices, etc.

BRIEF DESCRIPTION OF THE DRAWINGS

The invention will be better understood by way of the following detailed description of embodiments of the invention with reference to the appended drawings, in which:

FIG. 5C illustrates the passage of light through the cell of FIG. 5B in which different angles of incidence see different LC orientations.

FIG. 7A is a plot illustrating for a standard achromatic lens (2.5 cm aperture, F-1=17.54 Diopter) the angular asymmetry; pupil diameter of Shack-Hartmann Wavefront sensor is 4 mm.

FIG. 7B is a plot corresponding to FIG. 7A for a standard TLCL.

FIG. 9 illustrates schematically a side view of angular asymmetry compensation by using split cells (an additional benefit is the improvement of the speed by a factor of 4).

FIG. 14 illustrates schematically a side view of a half TLCL including a split cell.

DETAILED DESCRIPTION

Figure 1A:
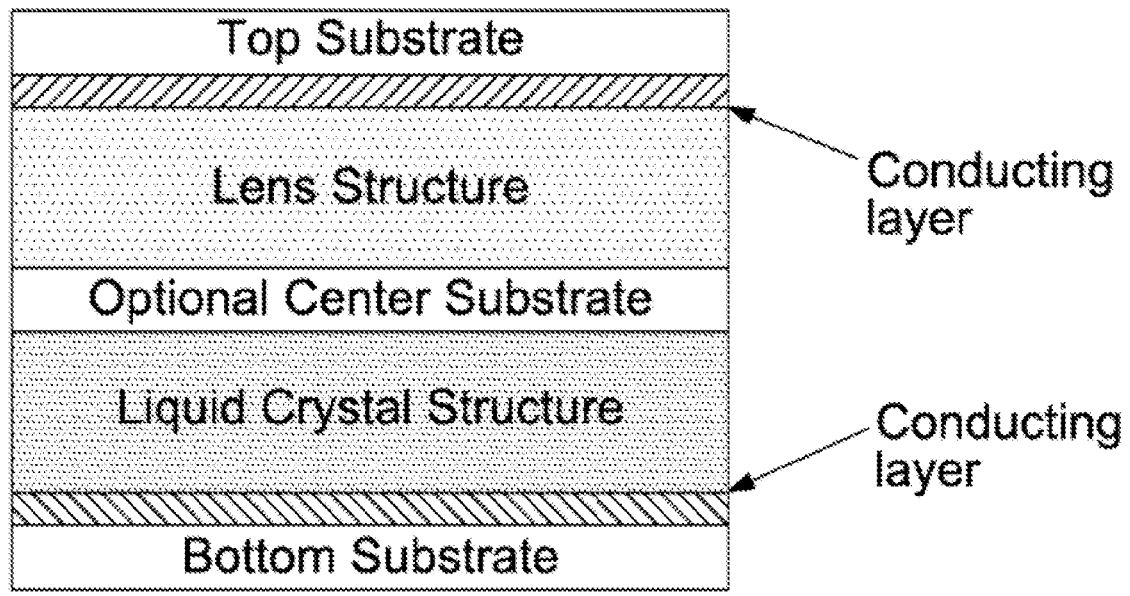
FIG. 1A shows the basic structure of one half of a TLCL in cross-section.
Figure 1B:
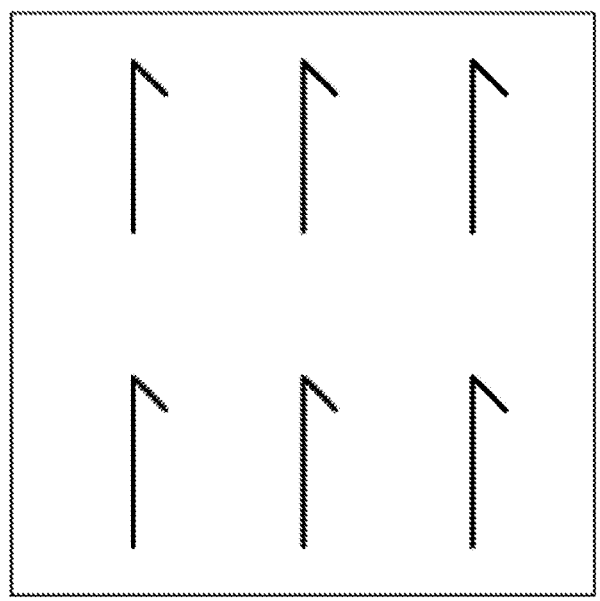
FIG. 1B shows the basic structure of one half of a TLCL in plan view.

FIG. 1A shows the basic structure of one half of a TLCL in cross-section and FIG. 1B in plan view. The TLCL is composed of two of these ½ TLCLs, as will be shown in the following example. Other variations of this structure exist and the inventions discussed in this disclosure may equally apply to those variations.

The ½ TLCL is composed of two main layers: the liquid crystal (LC) layer and the lens structure layer. The function of these layers is discussed in detail elsewhere. These two layers are bounded by two additional layers consisting of substrates with conductive electrodes. An optional central substrate may serve as a dividing layer between the LC and lens structure. The plan view shows one additional feature of the TLCL. The LC layer has a unique orientation along one direction. Because of this property of the LC, ½ of a TLCL only effects one polarization (½ of the light) passing through the device. In order for all of the light passing through the device to be effected by the TLCL, a second ½ lens, with its polarization direction rotated by 90 degrees, must be used.

Figure 2A:
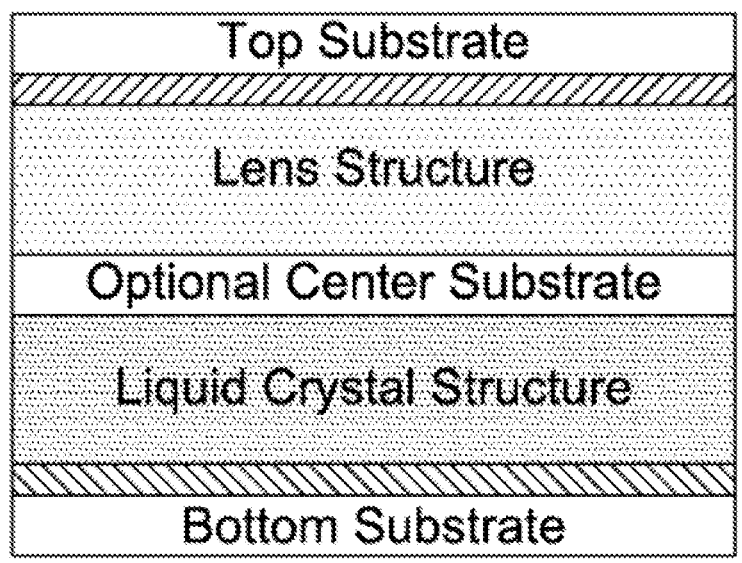
FIGS. 2A and 2B show one ½ TLCL as in FIGS. 1A and 1B juxtaposed a second half TLCL in FIGS. 2C and 2D rotated in the plane of the device by 90 degrees.
Figure 2B:
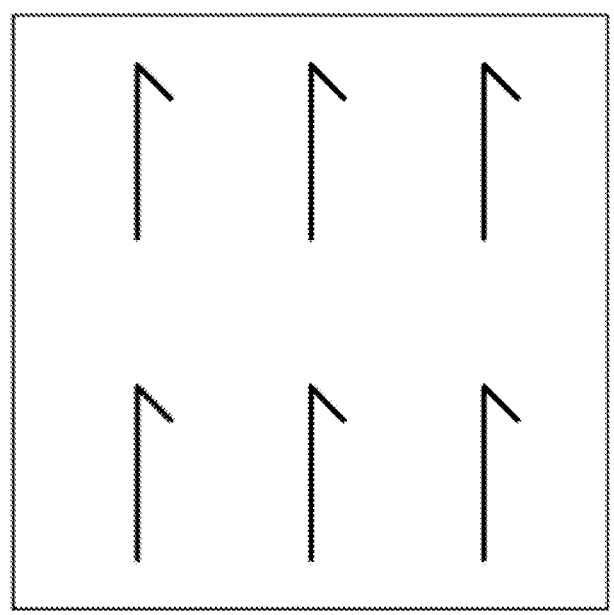
Figure 2C:
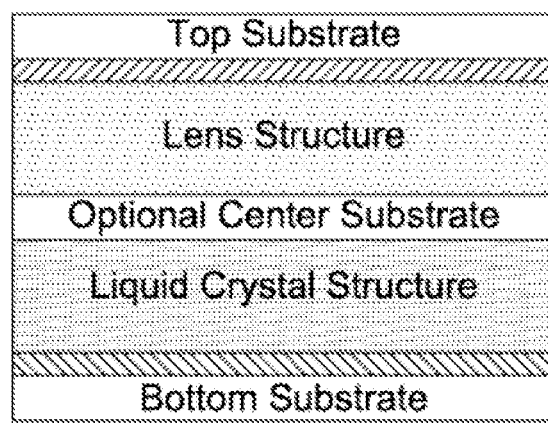
Figure 2D:
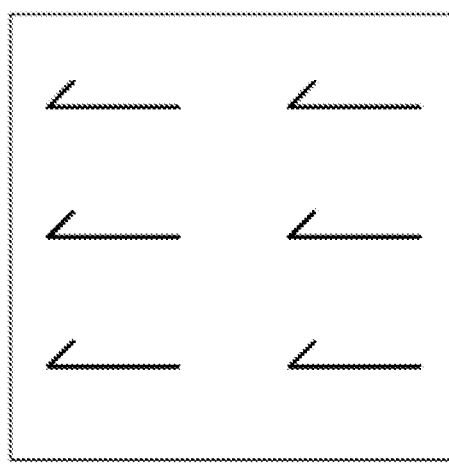
Figure 3A:
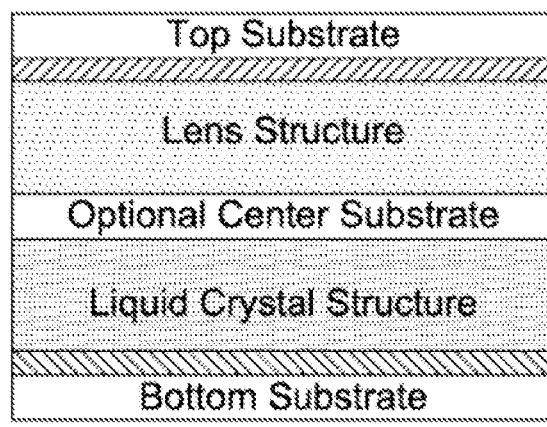
FIGS. 3A through 3D shows the second ½ TLCL of FIGS. 2C and 2D after being flipped over such that the top and bottom of the device are reversed relative to the first ½ TLCL.
Figure 3B:
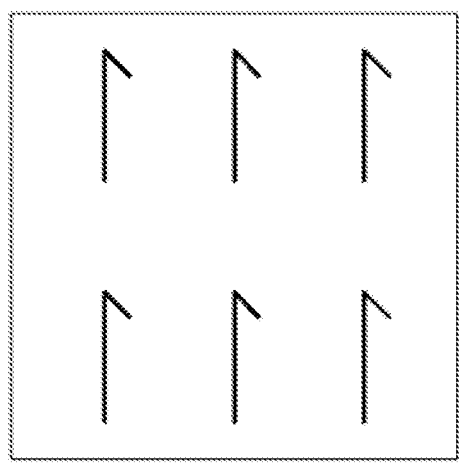
Figure 3C:
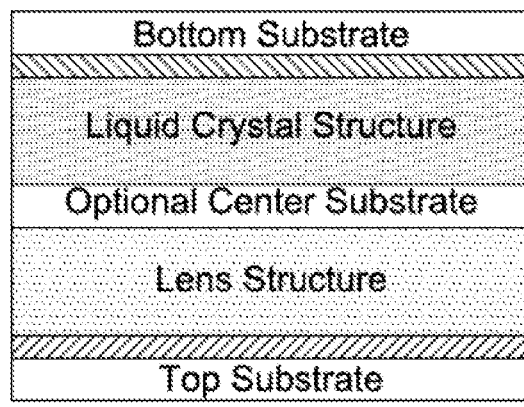
Figure 3D:
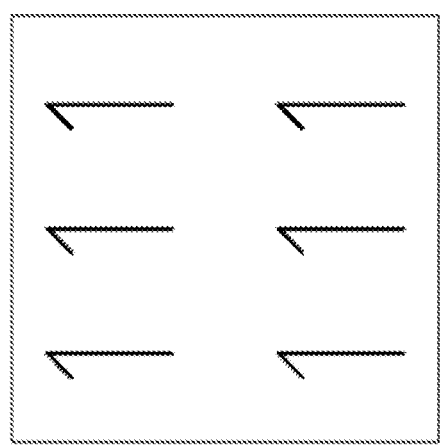
Figure 4A:
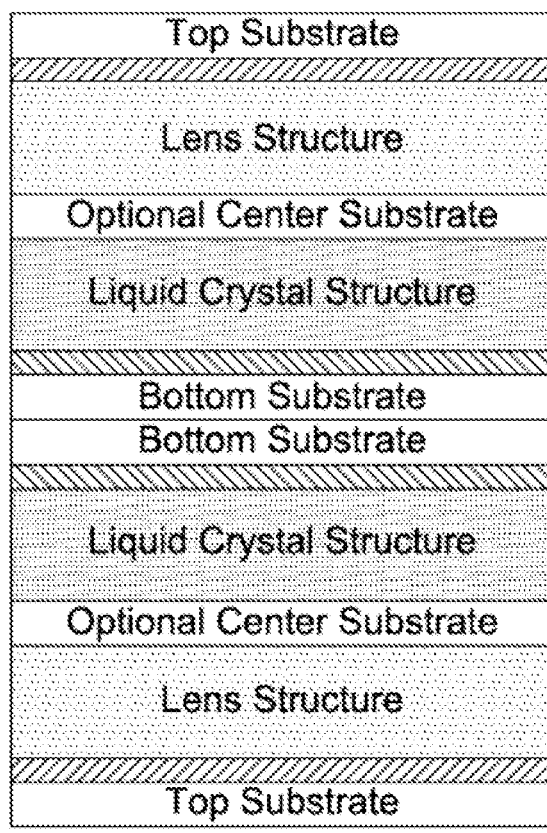
FIG. 4A is a side view of the two ½ TLCLs of FIGS. 2 and 3 mated together resulting in a complete TLCL.
Figure 4B:
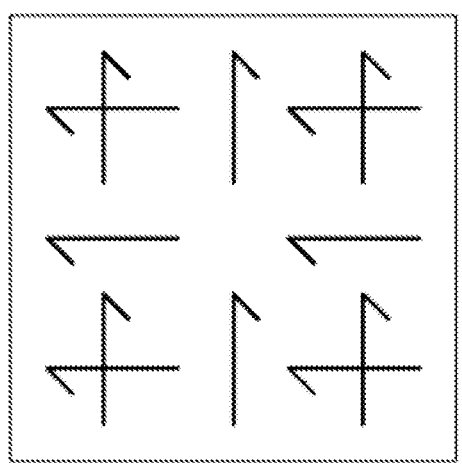
FIG. 4B is the corresponding plan view showing that both polarizations are provided.

FIGS. 2A and 2C show two ½ TLCLs with the second rotated in the plane of the device by 90 degrees, as illustrated in corresponding FIGS. 2B and 2D. FIG. 3C shows the second ½ TLCL after being flipped over such that the top and bottom of the device are reversed relative to the first ½ TLCL. Finally, in FIG. 4A the two ½ TLCLs are mated together resulting in a complete TLCL, and FIG. 4B shows the resulting combined polarizations.

To make electrical connections to such a device is not simple. The electrodes adjacent to the lens structure in both ½ TLCLs must be connected together and to an external contact. Similarly, the electrodes adjacent to the LC in both ½ TLCLs must be connected together and to a different external contact. Making such contacts in an inexpensive manner is not obvious. Care must be taken such that when making the contacts, the opposite electrodes are not also contacted. In addition, the electrodes are necessarily very thin, making robust connections to the edges difficult.

An embodiment of manufacturing the TLCL will now be described. The process starts with bare glass substrates. The glass used for these substrates is typically a borosilicate glass which is manufactured in very thin thicknesses, 100 microns or less.

The glass is cleaned using processes recommended by the glass manufacturer. These include a combination of detergent soaks, ultrasonic cleaning, and deionized water rinses.

The clean glass is then coated with a transparent conductive thin film electrode. Typically, this electrode is an indium tin oxide which is sputter deposited, although other thin film deposition techniques, such as evaporation, may also be used. To obtain a patterned electrode, the conductive electrode is deposited through a shadow mask, where the areas not to be coated are blocked by a metal mask.

The next step is to fabricate the liquid crystal (LC) cell. The glass wafers which form the upper and lower surfaces of the LC cell are first coated with an alignment layer. This layer serves to align the liquid crystal molecules. Typically, this will result in a surface with some microscope texture. It may be a polyimide layer which is later textured by rubbing with a cloth or may be an oxide film which is deposited in a manner which results in a highly textured surface.

After the textured surface is formed, the cell itself is fabricated. Three materials are deposited on one of the glass wafers that form the LC cell. The first material is any additional conducting material. This is often a conductive adhesive or solder. Also, a nonconducting adhesive is also deposited to define the area to be filled with liquid crystal material. Nonconductive adhesives are typically acrylic, epoxy, or silicone materials. Finally, the liquid crystal material is deposited. In one or more of the materials deposited, spacers are included. The spacers are typically glass or polymer spheres of a tightly controlled size which act to set the thickness of the LC cell. Finally the second glass wafer is placed on top of the dispensed materials and the adhesive materials are cured using heat, pressure, and/or light.

Next the lens structure is fabricated on the third glass wafer. The lens structure is typically fabricated from polymer layers with varying electrical and optical properties. Additional conductive materials (such as conductive adhesives and solders) and structural material (such as glass, polymer, or metal spacers) may be incorporated. After being fabricated, it is then bonded to the LC cell using an optical adhesive material. At this point, one half of a TLCL has been fabricated in wafer form.

The next step involves bonding two half TLCL wafer together. The two wafers are placed with their bottom glass back to back. In addition, one wafer is rotated 90 degrees relative to the other, so that the alignment of the LC cells in each half TLCL is at 90 degrees to each other. An optical adhesive is placed between the two wafers and the wafers are aligned such that the optical axes of the individual devices in each wafer are aligned. The optical adhesive is then cured using heat, pressure and/or light.

The next step involves singulating the TLCLs from the wafer. Typically this will be a scribe and break process, a mechanical dicing process, or an optical dicing process. In a scribe and break process, a linear defect (the scribe line) is formed in the wafer and then the wafer is stressed until the wafer fractures along the linear defect. For mechanical dicing, an abrasive wheel is used to remove a strip of material which separates a part of the wafer. In an optical dicing process, a laser is used to remove a strip of material to separate the wafer.

The finished TLCL can then be packaged by making contact to wires, lead frames, or flexible circuits. Typically a conductive adhesive or solder is used to make this connection. After making the connections, the area around the perimeter of the TLCL is filled with an encapsulating material which protects the TLCL from harsh environments and mechanical abuse.

As will be appreciated, each half TLCL has its orientation layer aligning the liquid crystal molecules in one direction. The electric field modulation of the liquid crystal layer creates a spatial variation in index of refraction for light polarized in one direction. Light polarized in the orthogonal direction sees a uniform index of refraction. By combining both polarization directions close to one another in a sandwich configuration, the lens operates efficiently on unpolarized light.

It will also be appreciated that the same wafer fabricated, singulated half TLCL can be simply rotated 90 degrees and flipped over to be mated with a like half TLCL to make a whole TLCL.

Figure 5A:
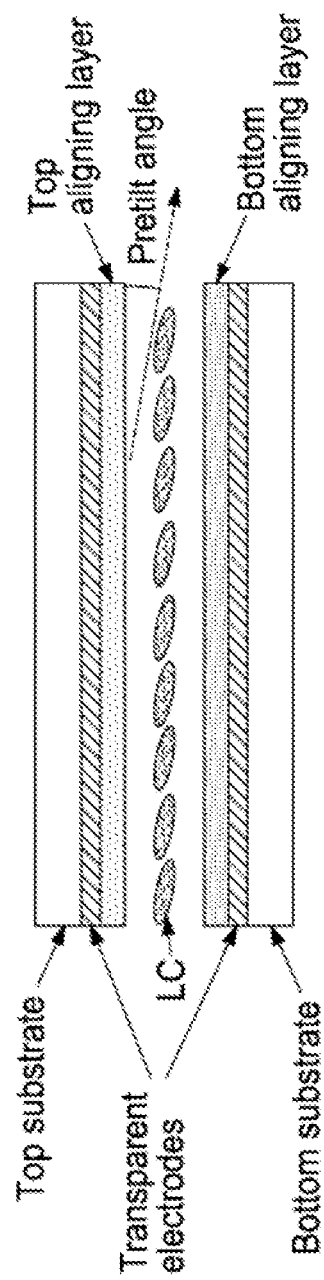
FIG. 5A illustrates schematically non-perturbed or zero-voltage liquid crystal cell.
Figure 5B:
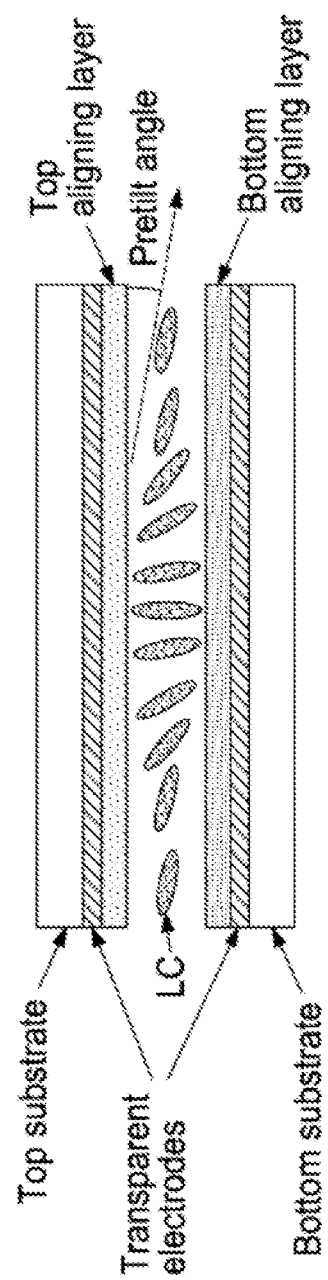
FIG. 5B illustrates schematically the cell of FIG. 5A when subjected to a spatially modulated electric field.

Since the liquid crystal molecule orientation is in one direction, albeit with different angles over the lens surface, rays that are at the same but opposite angles from the optical axis will encounter different indices of refraction. This is schematically illustrated in FIG. 5C in which a ray is illustrated that encounters a first liquid crystal layer more along a direction of molecules than a ray propagating along the optical axis, and then the same ray encounters a second liquid crystal layer almost perpendicularly to a direction of molecules. Although the effect on the propagation of light due to each of the two layers is very different, the combined effect of the two opposite orientation layer direction layers is essentially the same independent of the angle of incidence on the lens. FIG. 5A illustrates schematically non-perturbed or zero-voltage liquid crystal cell, while FIG. 5B illustrates schematically the cell of FIG. 5A when subjected to a spatially modulated electric field.

Figure 6A:
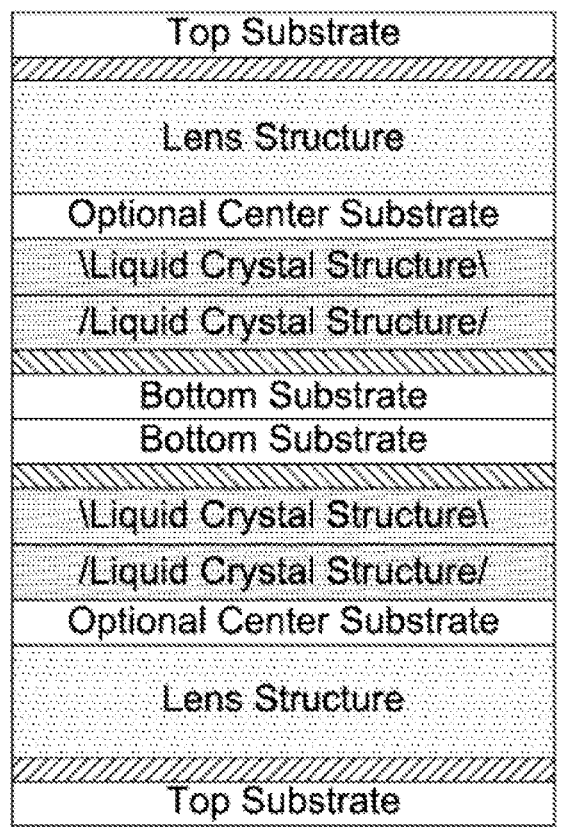
FIG. 6A is a side view of the two ½ TLCLs having the split cell structure of FIG. 5A mated together resulting in a complete TLCL.
Figure 6B:
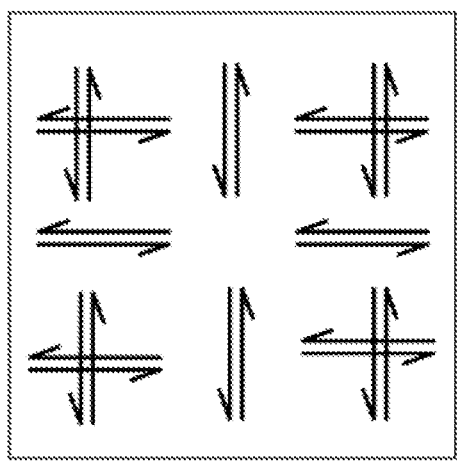
FIG. 6B is the corresponding plan view showing that both polarizations and pre-tilt directions are provided.

FIG. 6A is a side view of the two ½ TLCLs having the split cell structure of FIG. 5A mated together resulting in a complete TLCL, and FIG. 6B is the corresponding plan view showing that both polarizations and pre-tilt directions are provided.

In FIG. 6A, there is shown schematically a whole TLCL sandwich structure in which each half TLCL has two split cells with orientation layers extending in opposite directions, namely opposite pre-tilt angles. The split cells are roughly half the thickness of the half TLCL liquid crystal structure layer of FIG. 4. This has the advantage that the orientation layers have a greater influence on the order of the liquid crystal molecules within each split layer, and this can lead to faster response.

As shown in FIG. 6B, the resulting polarization is in orthogonal axes with the split cells providing liquid crystal orientation in both directions along each axis.

FIG. 7A is a plot illustrating experimental results for a standard achromatic lens (2.5 cm aperture, f−1=17.54 Diopter) the angular asymmetry; pupil diameter of Shack-Hartmann Wavefront sensor is 4 mm. FIG. 7B is a plot corresponding to FIG. 7A for a standard TLCL. This shows the relatively strong angular asymmetry for a TLCL lens.

Figure 8A:
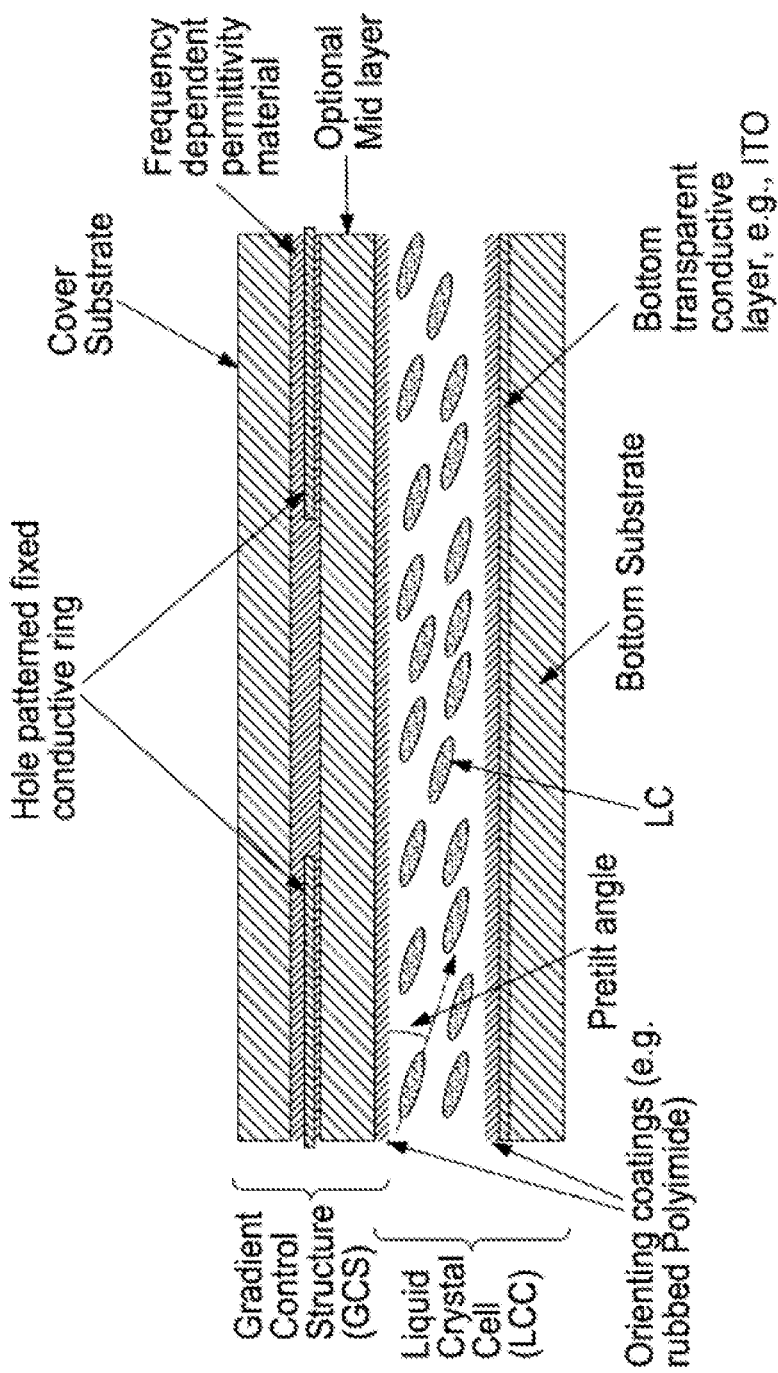
FIG. 8A illustrates schematically a side view of a single liquid crystal cell using an electric field spatial modulation layer having a frequency dependent permittivity material that shapes the potential at a hole-patterned electrode.

In the embodiment of FIG. 8A, the spatial modulation of the electric field controlling the liquid crystal is achieved without an electric field lens structure, as is the case in the above embodiments, and instead by using a hole-patterned electrode and a material that has a complex permittivity. This material has effectively a variable ability to allow charge transport as a function of control signal frequency. Thus the electric charge at the level of the plane of hole-patterned electrode can be restricted to the ring electrode at a first frequency, extend evenly across the hole at a second frequency, and have a gradient at frequencies between these first and second frequencies. It is thus possible to use a predetermined frequency to achieve a desired electric field gradient profile over the hole, and also to control this profile using the control signal frequency.

By way of a non-limiting example, the dimensions of an embodiment of the invention will be provided. It will be appreciated that dimensions can vary greatly depending on design choice and the choice of materials. The cover substrate can be made of glass with a thickness of 50 to 100 microns. The hole-patterned electrode can be made of an opaque metal such as aluminum, or it can be made of Indium Tin Oxide (ITO) which is transparent. The thickness of the electrode can be in the range of 10 to 50 nm. The frequency dependent permittivity material can be made of titanium oxide (TiO) with a thickness of about 10 nm. Titanium oxide has semiconductor properties that change with control signal frequency.

The frequency dependent permittivity (or complex dielectric) material can comprise a variety of materials as set out in the following. The essential property of such a material is that it can exhibit a weak conductivity that is variable as a function of the frequency of the control signal. This allows frequency tuning of the shape of the electric field to control optical quality or power, as well as frequency tuning of the on/off operation of the LC optical device.

HDCL Composition

Conductive Polymer Material (i) Polymerizable monomer (linear or cyclic) compound having at least one ethylenically unsaturated double bond can be used as the material with complex dielectric constant including imaginary part which describe conductivity. (ii) an initiator as essential components that is a combination of UV-Vis, NIR sensitive or thermally sensitive molecules (example: Mixed Triarylsulfonium Hexafluoroantimonate Salts, Hexafluorophosphate Salts) (iii) an additive to change the dielectric constant or conductivity of the final composition, this material maybe an organic ionic compound (such as Iodonium (4-methylphenyl)[4-(2-methylpropyl)phenyl]-hexafluorophosphate or Triarylsulfonium hexafluoroantimonate salts, mixed in propylene carbonate) or an inorganic ionic compound (such as Li+ClO4−, K+FClO4− etc.) or ionic organo-metalique compound (iv) an adhesive sensitive to UV-Vis, NIR or polymerized using thermal initiator to increase the adhesion of the polymer to the glass surface. The adhesive is maybe used as surface treatment agent or incorporated directly to the solution to increase the adhesion (v) a filler to change the viscosity of the mixture.

EXAMPLE

In order to prepare the first HDCL part of TLCL, 90% (wt.) of isodecyl acrylate (SR256) was mixed with 0.3% Li+ClO4− (wt %). Then 3% of an initiator; 2-hydroxyl 2-methyl 1,1-phenyl propanone (Darocure 1173) was added and the mixture stirred carefully at room temperature to obtain a homogeneous clear solution. Then a quantity of 10% of ECA (2-ethyl cyanoacrylate) (wt % of total mass of the monomers) was added and the final solution stirred carefully for 15 minute at room temperature and dark condition.

The mixture can be polymerized by an UV source by exposing the material 3 min with an intensity of 15 mV/cm2.

High Dielectric Constant Liquid

The HDCL part of TLCL may be chosen from any transparent liquid material, for example having an epsilon between 2.0 and 180.0, that has weak conductivity that varies with electric field frequency. The liquid may be a pure or mixture of alkylene carbonates family such as propylene carbonate (PC), ethylene carbonate or glycerin carbonate (GC) having epsilon of 67 and 111 respectively. A further composition is alkyl group, a substituted alkyl group, an alkyl carbonyl group, an alkoxycarbonyl group, an aryl group, a substituted aryl group, an aryl carbonyl group. A further composition is pure water, mixture of the water with an organic or inorganic composition such as glycerol, alkaline salt or rare alkaline salt.

Example 1

The HDCL having high epsilon is prepared by mixing of 7% distilled water in 93% glycerol. The solution is stirred for 15 min at room temperature (the refractive index of the solution is adjusted to a value of 1.4630 that is compared to the second part of hidden layer).

Electrolyte Gel

The composition of the electrolyte gel is as follow:

(i) Polymer material is used as matrix, (ii) Ionic composition (iii) ion transporter. In general all commercially available polymers (such as polyacrylic, epoxy material, polyurethane, polycarbonate, polyphenylic material) which are miscible with ionic and ion transporter compound can be used as polymer matrix. The ionic composition having the anion and cationic species is from the soluble alkaline or rare alkaline salt (such as Li+, K+, etc.), organic or organo-metalique compound.

The ion transporter material may be a pure liquid such as propylene carbonate (PC), ethylene carbonate (EC) or a mixture of two or more liquid or a monomer having a polar group such as etheric or phenoxy group. This polar group can be a side chain or may be incorporated in polymer's main chain. Example: (2(2-Ethoxyethoxy) Ethylacrylate monomer) in which the etheric group is a long side chain and play a role of ion transporter.

Example 1

Electrolyte gel is prepared by dissolving of 10% wt. of PMMA in 80% propylene carbonate (PC). The solution stirred over nigh at room temperature. Then a quantity of 10% wt. of Li+ClO4− was added to the solution and stirred at room temperature. The final gel like material is used as HDCL part of TLCL.

Ionic Conductive Liquid

Ionic liquid material having a different conductivity is also used as HDCL part of TLCL. This material is classed in different organic, inorganic or organo-metallic compound having the ionic species such as chlorate, perchlorate, borate, phosphate, and carbonate. The example of such material is: (1-Butyl-3-methylimidazolium tetrafluoroborate) and (1-Butyl-3-methyl imidazolium hexafluoro phosphate). These materials are used directly as high conductivity part of hidden layer.

Electronic Conductive

Polymers

The most important aspect of conjugated polymers is their ability to act as electronic conductors. These materials are ranging from conventional polymers (e.g. Polythiophene, polyaniline, polypyrrole, poly acetylene) or PEDOT poly(3, 4-ethylenedioxythiophene) and PEDT from Clevios to new polymers with specialized conductivity properties such as low band gap and intrinsically conducting polymers.

Nano Particle. The materials may be dispersed in the water, an organic solvent, monomer For example ATO ($(SnO_2)0.9(Sb_2O_5)0.1$) dispersed in the water or in the polyethylene glycol diacrylate, or the nano particle used in a powder form coated by sputtering as a thin layer on the substrate. Or the Carbon nanotubes (CNTs) that are allotropes of carbon with a cylindrical nanostructure. This material may be used as dispersed nanoparticles in the water or an organic material such as a monomer. The nanoparticles can be deposited by different technique such as spin coating process on the surface of the glass.

Metallic Oxide. Another possibility to prepare the HDCL part in TLCL technologies is based on deposition of metallic oxide as a thin film on the surface of the glass substrate. In this case, the metallic compound is deposited on the surface of the glass followed oxidation process. In this method a metallic target is used for e-beam, sputtering or thermal evaporation process.

For example, metallic oxides compound such as $SnO_2$, $Ti_3O_5$, $ZnS$, $ZnO_2$, etc. prepared by e-beam technique can be used as HDCL part.

Conductive Glass. Conductive glass can also be used as HDCL part in TLCL technology. In this case, the conductive material can be doped in the glass (bulk) and used as target in thin film deposition technique (such as e-beam, sputtering or sol-gel process, etc).

Example: Molybdenum, Silver or a mixture of them can be doped directly into the glass and used as conductive glass target for thin film deposition technique.

While a $Ti_3O_5$ (titanium oxide) layer may be about 10 nm thick, a polymer that provides some ionic conductivity can work well, however the thickness would be in the range of 0.1 to 30 microns.

Referring again to FIG. 8A, the optional mid layer can have a thickness of 50 microns and be made of glass. The top and bottom alignment layers can be polyimide layers of about 20 to 40 nm thick that are rubbed to yield surfaces that induce a liquid crystal ground state alignment with a low angle pre-tilt. The layer of liquid crystal can be 5 to 30 microns thick. Such a single layer of liquid crystal with spatial modulation form a gradient index lens focuses a single linear polarization of light, and as described above, focused light differently as a function of incidence angle.

Figure 8B:
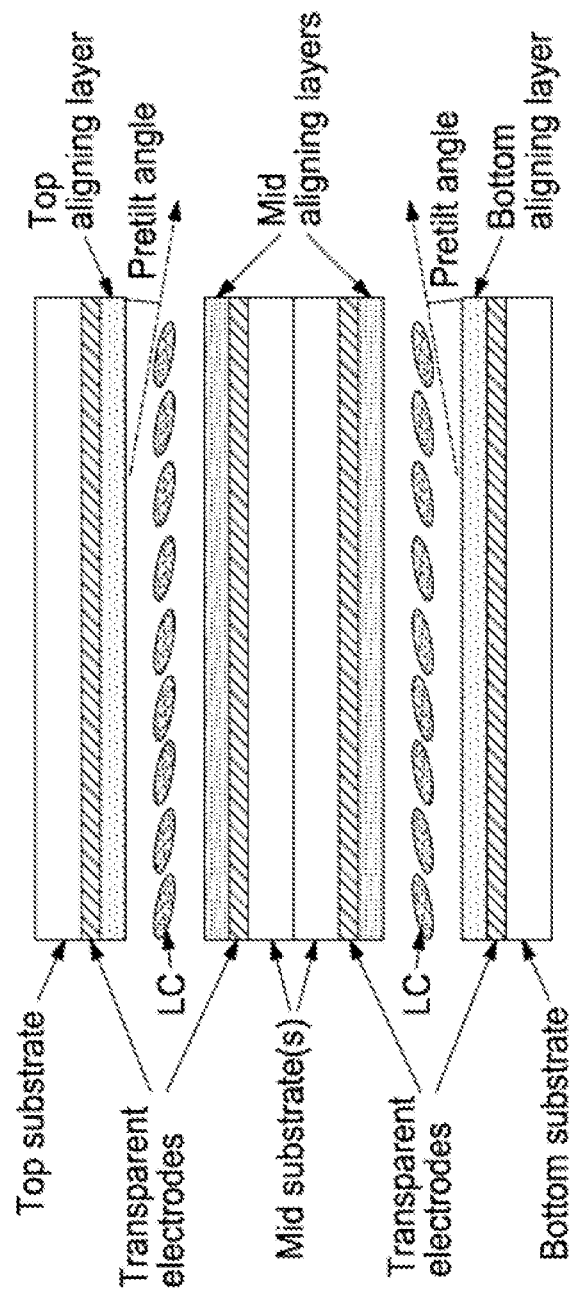
FIG. 8B illustrates schematically a side view of a split liquid crystal cell in the ground (non excited) state with two uniform cells and pre-tilt angles of opposite sign.

FIG. 8B illustrates a side view of a split liquid crystal cell in the ground (non excited) state with two uniform cells and pre-tilt angles of opposite sign. The source of the spatially modulated electric field can be electrodes in accordance with FIG. 8A. The mid substrates are shown as two separate substrates, and it will be appreciated that a single substrate can be used when the wafer is assembled with multiple LC layers. The electrode of the mid layer can also be a single electrode that is shared by the upper and the lower LC layers.

FIG. 9 illustrates a side view of angular asymmetry compensation by using split cells. An additional benefit of this design is the improvement of the LC state change speed by a factor of 4.

Figure 10:
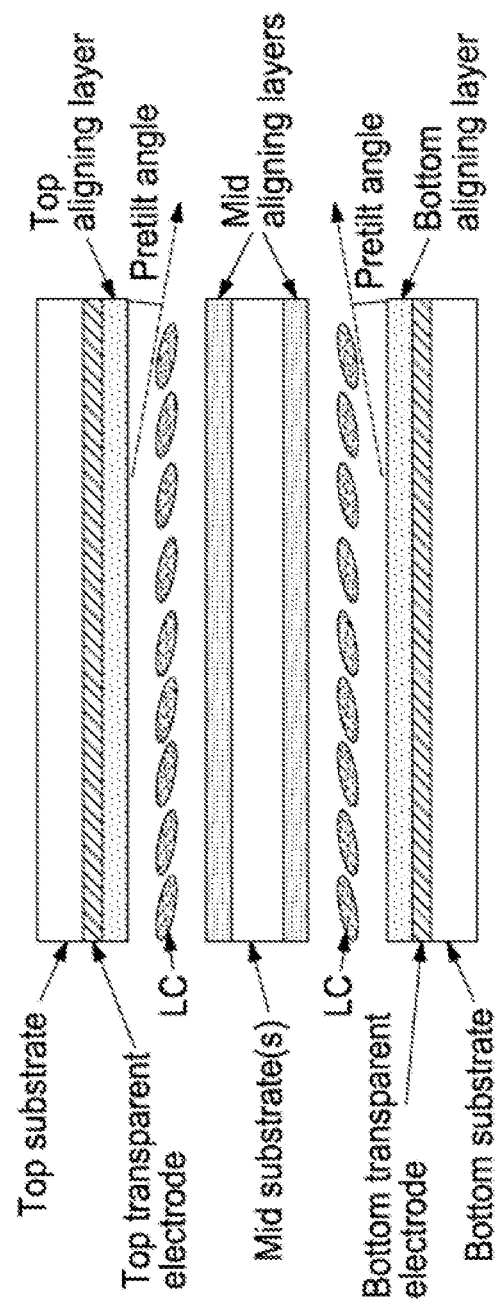
FIG. 10 illustrates schematically a side view of a split cell embodiment with only two electrodes (optical transmission is better but driving voltages would be higher).

FIG. 10 illustrates a side view of a split cell embodiment with only two electrodes. Optical transmission is better but driving voltages are higher in this embodiment.

Figure 11:
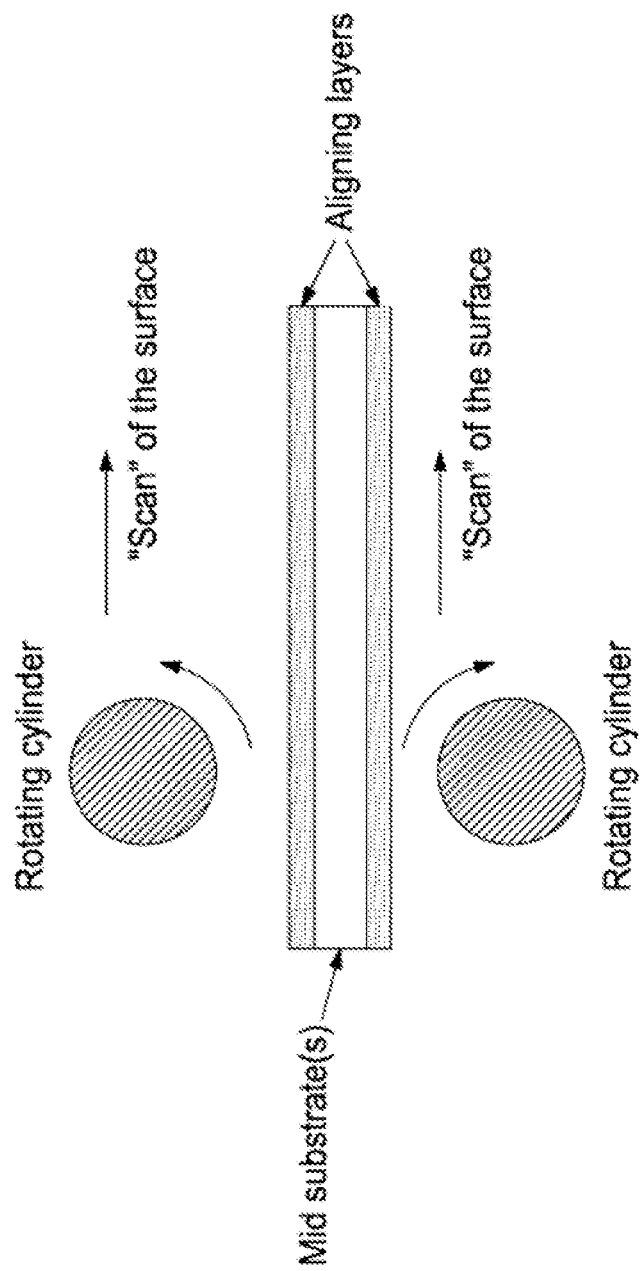
FIG. 11 illustrates fabrication of the mid substrate for in-plane split cells.

FIG. 11 illustrates fabrication of the mid substrate for in-plane split cells. It will be appreciated that by applying a rubbing force in an opposed manner, it is possible to treat both sides of the mid substrate at the same time while providing the substrate with the mechanical support necessary to withstand the rubbing. With a suitable coating such as polyimide, rubbing can create an alignment surface with a pre-tilt angle. This fabrication technique can allow the fabrication of thin mid substrates with alignment layer surfaces as thin as about 20 to 80 microns thick.

Figure 12:
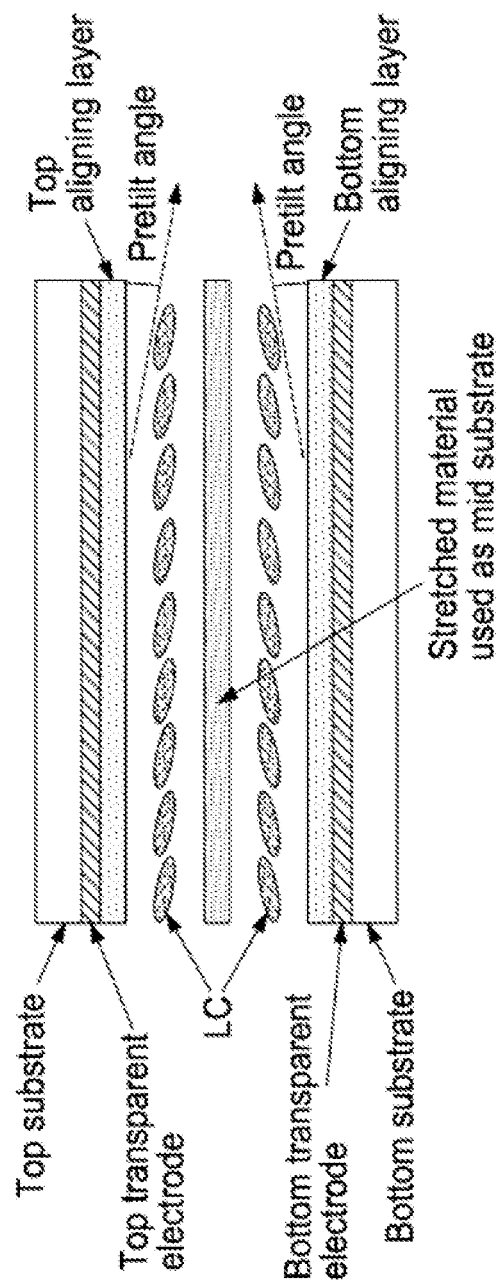
FIG. 12 illustrates schematically an embodiment similar to FIG. 10 in which the middle substrate is replaced by a stretched material.

FIG. 12 illustrates an embodiment similar to FIG. 10 in which the middle substrate is replaced by a stretched material. This reduces the thickness of the structure, thus improving electric field control. For example, 20 micron thick polyimide can be suitable. Stretching of the polymer material also creates a direction of the surface on the polymer that helps keep the liquid crystal oriented in the direction set out by the alignment layer. Stretching is a known technique of fabrication of anisotropic (or dichroic) polymer layers. When stretched in a given direction, many polymers can generate optical anisotropy. One of the mechanisms of such anisotropy is the alignment of molecular chains in the direction of stretching. When a liquid crystal is put in touch with a non stretched polymer surface, then there is no preferential direction of alignment. However, if the polymer is stretched and if it is composed of molecules which favor the parallel alignment of LC molecules, then the LC will be aligned in the stretched direction. Thus, without having a rubbed surface, a stretched material can help maintain order of LC molecules when the alignment layer is only on one surface of the LC cell. Of course, when the LC cell is thin, the influence of the single aligning layer can be sufficient if the mid substrate did not strongly attract the LC molecules in a different orientation.

Figure 13A:
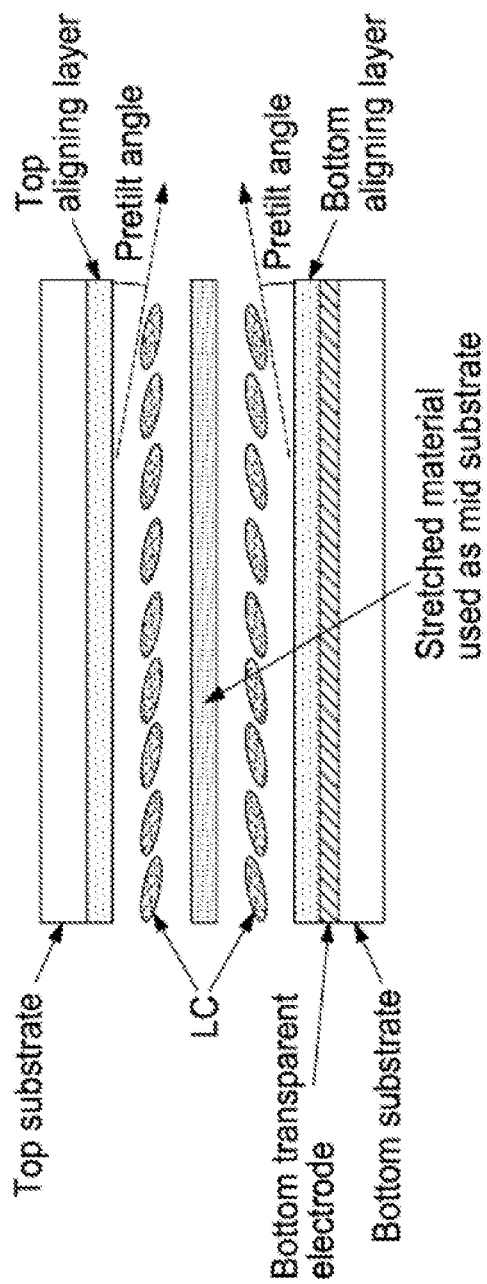
FIG. 13A illustrates schematically an embodiment similar to FIG. 12 having only one planar electrode, the other electrode being provided by the other half TLCL.
Figure 13B:
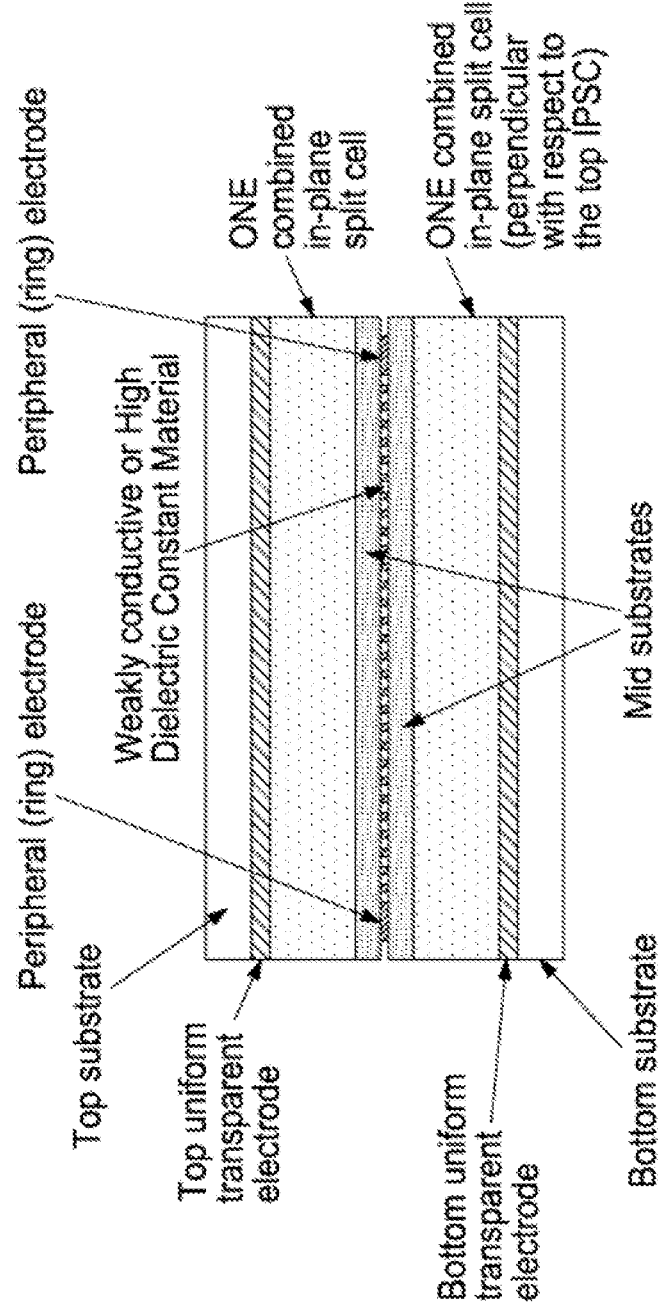
FIG. 13B illustrates schematically an embodiment in which two IPSC's of FIG. 13A are arranged with a middle electrode structure according to FIG. 8A that includes a complex dielectric material and hole-patterned or ring electrode.

FIG. 13A illustrates an embodiment similar to FIG. 12 having only one planar electrode, the other electrode being provided by the other half TLCL. In the embodiment of FIG. 13B, a hole-patterned electrode and complex dielectric material (see FIG. 8A) is placed on the top substrate, and this electrode is shared between two in-plane split cells.

In one embodiment, an in-plane split cell (IPSO) without a top electrode is made and bonded to the IPSO having the hole-patterned electrode. The appropriate 90 degree rotation is made to have both polarizations. The top substrate can be made thinner than the bottom substrate such that the two top substrates bonded together to form what is essentially a mid substrate has sufficient strength while maintaining a desirable overall thickness.

Alternatively, a middle layer can be prepared separately that comprises the two "Top substrates" that have a hole-patterned electrode and complex dielectric material sandwiched between them and alignment layers on both outer surfaces of the sandwich. This middle layer can then be assembled in the stack that will have the four LC layers.

Providing the layer that determines the spatial modulation of the electric field in the middle of the assembly has the advantage that it equally affects the electric field in the layer or layers below the modulation layer as above. By providing a middle electrode, the separation between electrodes is essentially halved, and in spite of the need to drive two electrode cells, the voltage and corresponding power consumption is greatly reduced.

It will be appreciated that a four layer TLCL can be assembled in this manner that can have a lens diameter of about 1 to 3 mm with a thickness of about 460 microns. The optical power of the TLCL can be about 10 diopters, which is suitable for most camera applications.

FIG. 14 illustrates a side view of a half TLCL including a split cell.

Figure 15:
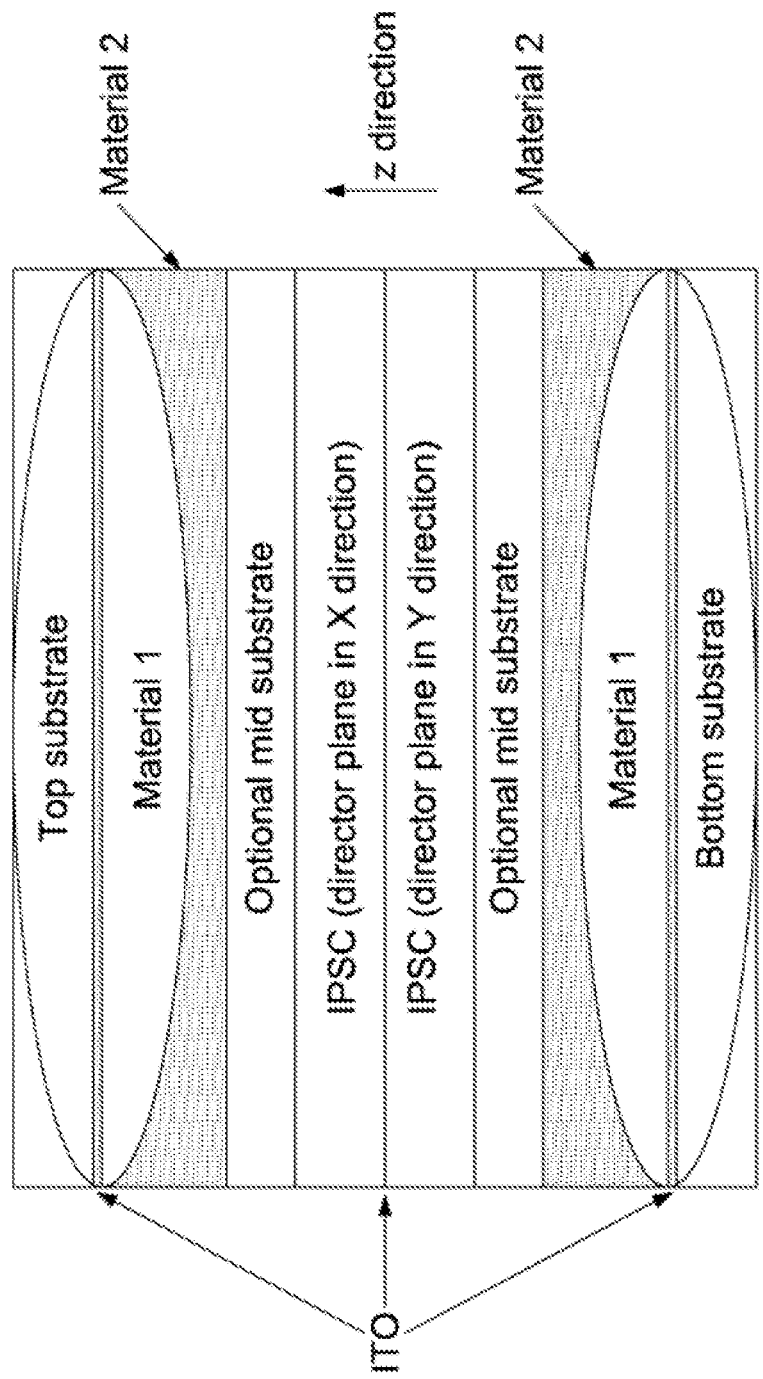
FIG. 15 illustrates schematically a side view of a whole TLCL in which each half includes a split cell.

FIG. 15 illustrates a side view of a whole TLCL in which each half includes a split cell.

What is claimed is:

1. A liquid crystal gradient index optical lens device having a layered structure, the device comprising:
    four liquid crystal layers in split liquid crystal cells for acting on essentially orthogonal linear polarizations of light, each liquid crystal cell having an alignment surface that defines in a liquid crystal material a spatially uniform pre-tilt angle of opposite signs; and
    planar electrodes for generating an electric field controlling an orientation of said liquid crystal material, wherein one of said electrodes being patterned and said electric field is spatially modulated using a layer of complex dielectric material associated with said patterned electrode to shape said electric field as a function of control signal frequency, wherein said one electrode is a middle electrode operating between opposed planar electrodes defining separately an electric field on each side of said one electrode, wherein said liquid crystal optical device has angular symmetry of optical power.

2. The device as defined in claim 1, wherein said middle electrode is deposited on a surface of a first thin rigid substrate with a second thin rigid substrate bonded over said middle electrode, wherein said alignment surfaces can be arranged on outer surfaces of said middle electrode.

3. A liquid crystal optical device having a layered structure, the device comprising:
    split liquid crystal cells each having an alignment surface that defines in a liquid crystal material a pre-tilt angle of opposite signs; and
    electrodes for generating an electric field controlling an orientation of said liquid crystal material, wherein said split liquid crystal cells comprise a middle separation substrate that has surfaces that define a direction of ordering of the liquid crystal without defining a pre-tilt angle and wherein said liquid crystal optical device has angular symmetry of optical power.

4. The device as defined in claim 3, wherein said middle separation substrate comprises a sheet of material stretched in said direction of ordering.

5. The device as defined in claim 4, wherein said sheet of material is made of polyimide.

6. The device as defined in claim 3, comprising four liquid crystal cells for acting on essentially orthogonal linear polarizations of light.

7. The device as defined in claim 6, wherein said pre-tilt is spatially uniform.

8. The device as defined in claim 7, wherein said device is a gradient index lens.

9. The device as defined in claim 8, wherein said electrodes are planar electrodes with one of said electrodes being patterned and said electric field is spatially modulated using a layer of complex dielectric material associated with said patterned electrode to shape said electric field as a function of control signal frequency.

* * * * *